United States Patent [19]

Fields

[11] 4,125,333
[45] Nov. 14, 1978

[54] EXTRUSION APPARATUS

[76] Inventor: Reuben T. Fields, 2146 Culver Dr., Colonial Village, Wilmington, Del. 19810

[21] Appl. No.: 675,995

[22] Filed: Apr. 12, 1976

Related U.S. Application Data

[63] Continuation-in-part of Ser. No. 460,357, Apr. 12, 1974, abandoned.

[51] Int. Cl.² .......................... B29B 1/06; B01F 7/08
[52] U.S. Cl. ..................................... 366/79; 366/146; 366/318
[58] Field of Search ............... 259/191, 192, 193, 194, 259/9, 10, 25, 26, 45, 46; 425/207, 208, 209; 264/176 R, 185

[56] References Cited

U.S. PATENT DOCUMENTS

| | | | |
|---|---|---|---|
| 2,639,464 | 5/1953 | Magerkurth | 259/191 |
| 2,787,022 | 4/1957 | Chisholm | 425/208 |
| 3,164,375 | 1/1965 | Frenkel | 259/9 |

Primary Examiner—Robert W. Jenkins

[57] ABSTRACT

An apparatus useful for the extrusion of high melting slippery plastic resins comprising a screw element which operates rotatably within a close-fitting barrel having cut into the interior surface thereof a shallow and narrow groove of the same hand and substantially the same lead as the screw element.

10 Claims, 2 Drawing Figures

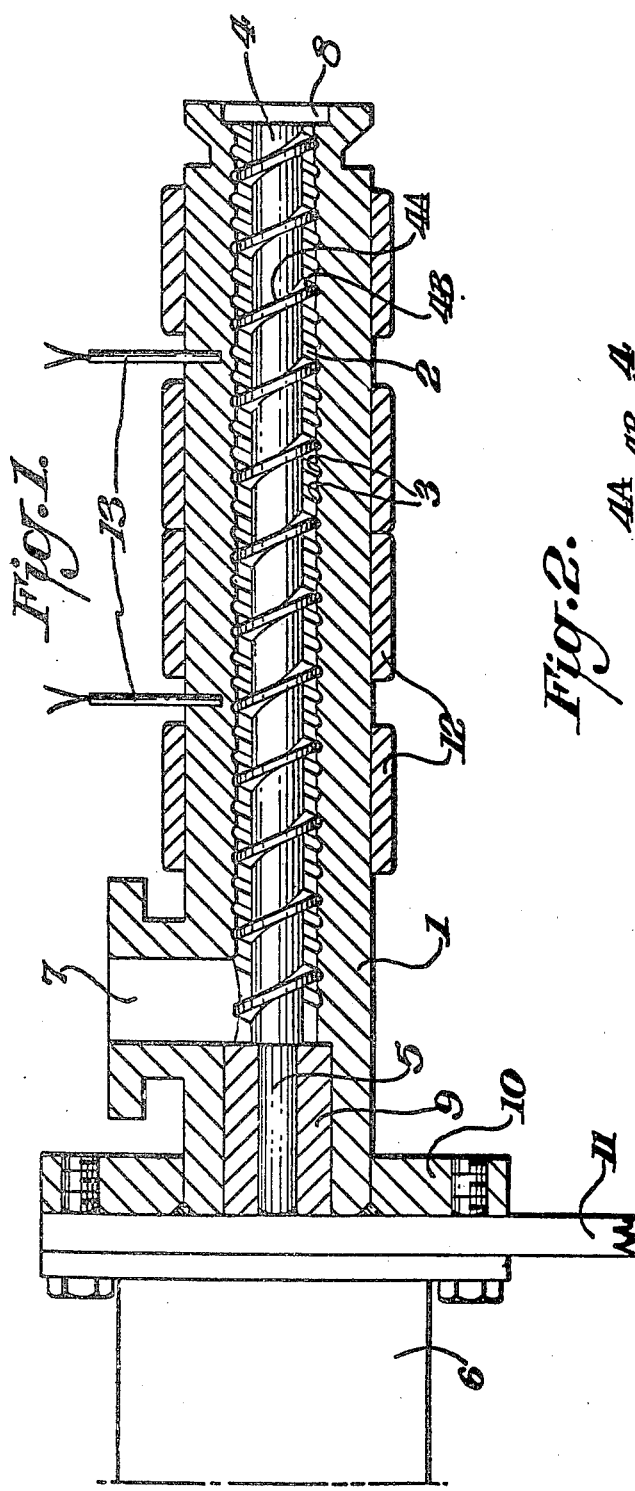
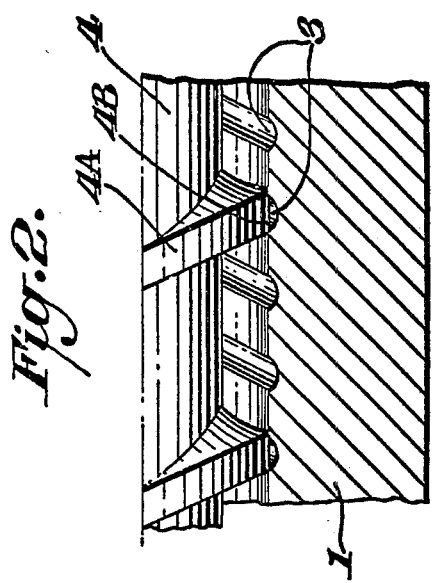

EXTRUSION APPARATUS

RELATIONSHIP TO OTHER APPLICATIONS

This application is a continuation-in-part application of my co-pending application Ser. No. 460,357, filed Apr. 12, 1974, now abandoned.

FIELD OF THE INVENTION

This invention relates to apparatus for improvement in the uniformity of extrusion rate in the extrusion of formed articles of narrow dimensional tolerance from a small class of synthetic polymers which are difficult to produce by means of the more conventional extruders now available.

BACKGROUND OF THE INVENTION

The use of a screw rotating inside a close-fitting cylinder to move material forward has had many commercial applications. The ability of a particular screw to move the material forward is greatly dependent on the nature of the material being moved. It is possible to use a screw to pump water, syrups, soaps, molten polymers, elastomers and even solid metals, but the apparatus to do each of these operations must be built with the limitations and the properties of the pumped material clearly in mind. There is no such thing as a "universal" extruder which handles all types of material well.

The first large-scale commercial application of screw extruders came with the development of rubber tires for automobiles. The processing of uncured rubber required mechanical working, incorporation of fillers and vulcanizing agents, control of temperature and the extrusion of the well-mixed compound into a strip of desired cross section for further processing. The efficiency of producing the right degree of each of these several goals was related to the design of the screw and barrel as well as to the speed of rotation of the screw. As a result, large numbers of improvements were made to increase the utility of the extruder and to make feasible a high rate of production without loss of vital control features such as temperature and pressure. It is important to point out that all rubber compositions in the uncured state are soft and "tacky," that is they readily adhere to almost everything, but especially to smooth metal surfaces such as found in the screw and barrel of rubber extruders and to itself.

In the early days of the plastics industry, most of the material produced was some form of nitrocellulose which was very dangerous to handle in the solid state. While it could be softened somewhat with heat, excessive local heat would cause the ignition and explosion of the material. For this reason, the nitrocellulose and plasticizer (such as camphor) were combined with a solvent (such as ethyl alcohol) to give a mix that could be processed with reasonable safety into a semi-finished article which was then put into usable condition by seasoning out the solvent. The solvent-containing mix was quite similar in its properties to an uncured rubber mix, so that it proved practical to use a screw and barrel adapted from the rubber industry. One such application is shown in U.S. Pat. No. 2,146,532 that shows the use of a screw to remove plastic material from an evacuated chamber.

From 1930 to 1940, many synthetic resins were developed. This was the time for the separation of the plastics industry into two distinct branches; the elastomers, comprising rubber and synthetic rubber-like materials, and the synthetic resin materials, characterized by being relatively hard and slippery at room temperature, and being so thermally stable that they could be melted to a low viscosity (compared to rubber) liquid that could be easily formed into articles of desired shape and dimension by simply cooling below the melting point. Among these synthetic polymers should be mentioned polyethylene, polypropylene, polymethyl methacrylate, poly vinyl chloride, polyoxy methylene, nylon, polyethylene terephthalate and polytetrafluoroethylene. All of these materials are very different from rubber and other elastomeric materials in hardness and coefficient of friction toward metals and toward itself. Unlike rubber, they are sharp melting or have a very narrow temperature range between a hard solid and a low viscosity fluid. Also, some are very sensitive to decomposition from heat, so that local overheating must be avoided in any processing step.

One of the first applications of an extrusion screw to molten nylon is described in my U.S. Pat. No. 2,295,942 that shows how a very shallow threaded screw can be used to give uniform delivery of a molasses-like liquid against considerable back-pressure of a filter and die.

The use of this type of screw thread was extended to include the melting of nylon polymer chips in the portion of the extruder adjacent to the feed throat. It was soon found that this type of screw and barrel also gave excellent results with polyethylene resins, and the design was freely offered by duPont to the makers of extrusion equipment. The introduction of the screw and barrel designed specifically for the new class of synthetic resins was followed by a tremendous growth in the industry and in the industry supplying the new type of extruder.

The rapid growth of the extrusion business made it expedient to conduct an engineering study of the process in order to optimize the efficiency of the equipment. These studies were reported through meetings and publications of the Society of Plastics Engineers and did much to call attention to the subtle variables which affect the performance of an extruder. Several U.S. patents were issued covering some of these improvements.

Most of these prior art developments involve the design of the screw element but some of them relate to the barrel or cylinder in which the screw rotates. An example of the latter is the use of fluting or threading inside the barrel at the feed end of the extruder. The use of longer barrels and screws assist in maintaining a uniform rate of resin output, however, at the same time temperature control becomes almost unmanageable with resins having high viscosity. The use of shallow screws provides better control of output uniformity, but appreciably reduces the amount of resin output. Similarly, the use of lower lead angles for the thread of the screw provides a more positive delivery at the expense of resin output. For these and other reasons, it has been found profitable to use a computer to determine the optimum design for an extruder for a particular resin, since each resin has its own properties of hardness, viscosity, coefficient of friction, etc.

As a result of the many studies on the effects of various types of screws and barrels, we find the type of extruder in common use for materials of the type of nylon, polyethylene, polyoxymethylene, etc., to be one of shallow depth screw, a single lead screw with lead roughly equal to screw diameter, a compression ratio from 1 to 2.5 or more, and a barrel length from 15 to 30 times the diameter of the bore of the barrel. Such an extruder gives an excellent performance when used with such materials as polyethylene of low or medium molecular weight, polypropylene and polymethacrylate. However, the physical properties of unmelted nylon, polyesters and high molecular weight polyethylene and polytetrafluoroethylene are such that the performance is erratic, and severe limitations are put upon the ability to operate the extruder at commercially useful rates. This appears to be due to the very low coefficient of friction of the polymer toward the metal wall of the extruder barrel. A study was made of ways to increase the grip between the polymer and the inner wall of the extruder barrel without hurting the ability of the extruder to give high output, uniform delivery and high pressure without appreciable loss of output.

In an attempt to improve the performance of the type of extruder described above, it was thought that narrow, shallow grooves cut into the inner surface of the barrel in a longitudinal direction would greatly increase the grip between the barrel wall and the polymeric material. Such a barrel was made with six shallow grooves (lengthwise of the barrel) approximately $\frac{1}{8}$ inch wide and 1/16 inch deep. Upon testing with polytetrafluoroethylene, it was found that the delivery of molten polymer from the extruder was excellent, so long as no restriction was placed on the flow from the exit of the extruder. When the outlet was restricted to build pressure, the output dropped rapidly so that at modest pressure of 2,000 to 3,000 psi, all output went to zero. Since the main object of building this extruder was to obtain a practical device for delivering through a filter (normal back-pressure of approximately 4,000 psi), it was apparent that the desired apparatus was not yet available.

After some months of trying to think of a way of gripping the wall of the barrel by the polymer, the idea came to me to make the barrel groove of the same hand, same lead and of a width less than the width of the land of the screw with which the barrel is associated. In this way, no openings would be made for the molten polymer to flow over the rib of the screw from the front (higher pressure) side to the rear (lower pressure) side, and we would have for the first time a barrel with grooves cut into it and still no place for a polymer to flow over the rib and thus destroy its pressure-building ability.

Of course, there was no good reason to believe that such a groove would help the barrel to grip the polymer and prevent the polymer from turning with the screw and thus not move forward in the desired manner. I discussed this feature (confidentially) with a highly respected plastic extrusion engineer and after consideration, he assured me that "such a groove would *not* help the performance — to be effective the barrel groove must be of opposite hand."

In spite of this discouraging appraisal of the likelihood of success, I decided to build and test such an extruder barrel for a 2-inch extruder which normally operates with a shallow screw with a 2-inch lead, a length of 15 to 30 diameters and a compression ratio of 2 to 3. The screw was right hand; the land of the screw about $\frac{1}{4}$ inch.

The tests were successful and the machine put into production.

SUMMARY OF THE INVENTION

This invention is directed to an extruder for the extrusion of molten or semi-molten plastic resins comprising a screw element which operates rotatably within a close-fitting barrel having a groove or a plurality of grooves cut into the inner surface thereof, said groove or grooves having the same hand and substantially the same lead as the screw element.

My invention is more particularly described as an extrusion apparatus for extruding plastic resins, comprising, in combination:

(a) a barrel member having a feed-port near one end and a discharge port at the opposite end, said barrel member having an interior surface extending substantially throughout the length of the barrel between the feed-port and the discharge port, said barrel member being adapted to receive a screw member having an appreciable land and a predetermined lead and hand, said interior surface of the barrel member having a spiral groove extending substantially throughout the length of said barrel, said groove having a lead substantially equal to the lead of the screw, a width that is equal to or less than the land of the screw and of the same hand as the screw;

(b) a screw member mounted within said barrel adapted to rotate within the barrel, said screw member having an appreciable land, a predetermined lead and hand and closely mating with said interior surface of said barrel member;

(c) rotating means for rotating said screw member and (d) heating means for heating said barrel member.

DESCRIPTION OF THE PREFERRED EMBODIMENTS

This invention will be more fully understood by reference to the following description illustrated by the accompanying drawings in which FIG. 1 is a longitudinal cross-sectional view of the screw extruder and FIG. 2 is an enlarged fragmental view showing the detail of the grooved barrel of this invention.

It is an object of this invention to provide an apparatus for the extrusion at a substantial rate, of the group of resins having a high melt viscosity, a low surface friction against metal, or a poor thermal stability, said extruder being able to operate against fairly high die pressure. It is a further object of this invention to obtain improved performance from a single screw extruder by changing the configuration of the extruder barrel.

In a single-screw extruder there is only one moving part, the screw, which rotates within the cylindrical barrel. When a resinous plastic material is introduced to the space between the barrel and screw, it is advanced or carried forward by the rotation of the screw. The forward movement of the resin is controlled primarily by the adhesion or friction of the resin to the screw and the barrel. If the resin adheres well to the barrel, it is advanced forward as the screw rotates. If the resin adheres to the screw and does not adhere to the barrel, the resin rotates with the screw and does not advance along the barrel. The adhesion or non-adhesion of resin to the screw and to the barrel can vary considerably over the wide range of resins in commercial use.

The objective of the present invention is to increase the grip of the inner barrel surface to the resin without introducing changes in other aspects of the extruder, such as the extruder's capacity to develop the high pressure needed to force the plastic through a forming die. I have found that spiral grooves cut in the inner surface of the barrel do not reduce the ability of the extruder to build high pressures and get steady rate of delivery provided that (1) the grooves, which are cut into the barrel to form spirals, are of the same hand as the screw, (2) the lead of the spiral groove is substantially that of the screw thread, and (3) the width of the groove or grooves is no greater than the width of the land of the screw thread. Such spiral grooves can be cut into the full length of the barrel, if desired, and can be cut with multiple leads to increase the gripping action of the barrel to the resinous material being processed. At no position of the screw is there a short "by-pass" across the land of the screw. The number of spiral grooves cut in the barrel wall is limited by the need of sufficient surface to support the screw and to give adequate surface for wear purposes. It is desirable to make the groove or grooves in the barrel wall of such shape that there is some purging of the material retained in the groove or grooves as the screw thread passes over it. I have found that a shallow crescent shaped groove provides an unexpected result of being self cleaning and at the same time provides adequate gripping action on the resinous material being processed.

As may be seen from the drawings, the apparatus comprises a barrel or housing 1 having a bore 2 with internal threads 3 and fitted with a close-fitting screw 4. The screw 4 is shown with a right hand thread or flight 4A with land 4B and integral drive shaft 5 which connects to an external source of rotational power 6. The width of the flat portion on the thread adjacent to the barrel is the land. The barrel 1 has a feed port opening 7 and an outlet end 8 to which an extrusion die can be attached (not shown). The barrel 1 can have a bushing 9 to support the shaft 5, a flange 10 for mounting the extruder barrel on a suitable support 11 and power source 6. The barrel 1 is fitted with suitable heater bands 12, controlled by thermo-couples 13 and a source of electric power, not shown.

The apparatus shown in the drawing is a preferred structure of this invention; however it is not necessary that the screw thread be single lead, or that the lead of the screw be equal to the internal diameter of the barrel, or that there be an arbitrary number of internal threads cut in the bore of the barrel.

The following examples illustrate the improved performance obtained by this invention.

EXAMPLE 1

An extruder barrel 30 inches long was made with a 2-inch diameter bore in which were cut five evenly spaced spiral, right hand grooves with a 2-inch lead. These grooves are about 0.12 inch wide by 0.09 inch deep and were made with a round cutter of 0.125 inch diameter, thus giving essentially crescent shaped grooves for the full length of the barrel. The barrel was fitted with a 30-inch long screw which had a right hand single lead thread with a 2-inch lead. The depth of the screw was 0.325 inch and the width of the land 0.25 inch and the diameter 1.995 inches. The extruder was equipped with the usual heaters, temperature control devices, drive mechanism, etc., which form no part of the present invention and are not described in detail.

A nitrile rubber modified acrylonitrile - methyl acrylate having a melting point of about 380° F. consists of basic copolymers produced by the graft copolymerization of 73-77 parts by weight acrylonitrile and 23-27 parts by weight of methyl acrylate in the presence of 8-10 parts by weight of butadiene — acrylonitrile copolymers containing approximately 70 percent by weight of units derived from butadiene was used in the extruder. This resin has the following properties:

| | |
|---|---|
| Nitrogen content (Kjeldahl method) | 16.5 - 19% |
| Intrinsic viscosity in acrylonitrile at 25° C. (ASTM Method D 1243-60 | not less than 0.29 deciliter per gram |
| Melt Index | 4.0 grams per 10 minutes |

This resin is sold commercially as Barex 210 by Vistron Corporation, Cleveland, Ohio. Performance of the extruder is shown in Table 1.

TABLE 1

| Screw R.P.M. | Pressure at die lbs/sq. in. | Melt Temp. ° F. | Delivery in grams per revolution of screw |
|---|---|---|---|
| 11 | 700 | 410 | 14.5 |
| 26 | 1200 | 400 | 14.2 |
| 30 | 2000 | 410 | 14.4 |
| 36 | 1250 | 385 | 14.2 |
| 40 | 2200 | 400 | 13.6 |
| 50 | 1800 | 390 | 14.2 |

A similar extruder with a smooth barrel 30 inches long and 2.052 inches inside diameter was fitted with a 30-inch screw having a right hand single thread lead with a 2-lead. The depth of the screw was 0.275 inch and the width of the land 0.25 inch and the diameter 2.047. The heaters, temperature control devices, drive mechanism, etc., were the same as used in the test described above. Performance of the extruder is shown in Table 2.

TABLE 2

| Screw R.P.M. | Pressure at die lbs/sq. in. | Melt Temp. ° F. | Delivery in grams per revolution of screw |
|---|---|---|---|
| 12.75 | 900 | 380 | 18.8 |
| 12 | 2000 | 405 | 13.1 |
| 20 | 1150 | 385 | 18.6 |
| 19 | 2000 | 390 | 14.8 |
| 35 | 2000 | 370 | 16.4 |
| 40 | 1500 | 375 | 13.6 |

From Table 1 it is clear that the extruder built in the manner disclosed in this patent has substantially uniform output of resin in terms of grams per revolution of the screw over the wide speed range of 11 to 50 revolutions per minute. It is also shown that the delivery was not appreciably reduced when the pressure at the extrusion die was varied from 700 to 2000 lbs. per square inch. However, from Table 2 which is data from a comparable extruder with a smooth barrel, it was observed that a change in pressure reduced the output of resin by as much as 20 percent, and increasing the speed from 12.75 RPM to 40 RPM also reduced the output by as much as 25 percent when measured as grams per revolution of the screw.

The apparatus as described in this invention is especially useful in processing the more difficult resins such as nylon, vinyl resins, polyoxymethylene resins, polyethylene terephthalate resins and fluorocarbon resins and their copolymers and terpolymers and the higher barrier acrylic thermoplastics.

It is preferred that the widths of the grooves cut into the barrel are in the range of 20 to 90% of the width of the land of the screw, however, 10 to 100% can be used. Preferably, the lead of the groove varies in range of 10% of the lead of the screw. However, the lead of the grooves can vary in the range of 20% of the lead of the screw, more or less.

Cutting of the grooves into the interior of the barrel can be accomplished by well known method such as those used to manufacture a rifled gun barrel. Other methods such as casting, grinding or electromilling can be used.

The foregoing detailed description had been given for clarity and understanding only and no necessary limitations are to be understood therefrom. The invention is not limited to the exact details shown and described, for obvious modifications will occur to those skilled in the art.

The embodiments of the invention in which an exclusive property or privilege is claimed are defined as follows:

1. An extrusion apparatus for extruding plastic resins having a low coefficient of friction, comprising, in combination:

(a) A barrel member having a feed-port near one end and a discharge port at the opposite end, said barrel member having an interior surface extending substantially throughout the length of the barrel between the feed-port and the discharge port, said barrel member adapted to receive a screw member having an appreciable land and a predetermined lead and hand, said interior surface of the barrel member having a shallow spiral groove extending substantially throughout the length of said barrel, said groove having a lead substantially equal to the lead of the screw, a width that is equal to or less than the land of the screw and of the same hand as the screw;

(b) a screw member mounted within said barrel adapted to rotate within the barrel, said screw member having a predetermined hand, a lead substantially equal to the diameter of the screw, an appreciable width of the land and closely mating with said interior surface of said barrel member; whereby said groove produces an increased grip of the barrel on said plastic resin to produce a uniform delivery and high output of said plastic resin and high pressure without appreciable loss of output;

(c) rotating means for rotating said screw member; and (d) heating means for heating said barrel member.

2. The apparatus of claim 1 having a plurality of said grooves.

3. The apparatus of claim 1 wherein said groove has the same hand and substantially the same lead as said screw and the width of said groove is less than the land of said screw.

4. The apparatus of claim 3 having a plurality of said grooves.

5. The apparatus of claim 1 in which the width of the groove is from 20 to 90% of the width of the land of the screw.

6. The apparatus of claim 5 having a plurality of said grooves.

7. The apparatus of claim 1 in which the lead of the grooves varies in the range of 10% greater or less than the lead of the screw.

8. The apparatus of claim 7 having a plurality of said grooves.

9. The apparatus of claim 1 in which the groove has a crescent-shaped cross section.

10. The apparatus of claim 9 having a plurality of said grooves.